United States Patent
Palazzo et al.

(10) Patent No.: US 9,825,310 B2
(45) Date of Patent: Nov. 21, 2017

(54) HIGH CAPACITY CATHODE MATERIAL WITH IMPROVED OPERATING VOLTAGE

(71) Applicant: Greatbatch Ltd., Clarence, NY (US)

(72) Inventors: Marcus J. Palazzo, Wheatfield, NY (US); Ashish Shah, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 188 days.

(21) Appl. No.: 14/697,028

(22) Filed: Apr. 27, 2015

(65) Prior Publication Data

US 2015/0311498 A1  Oct. 29, 2015

Related U.S. Application Data

(60) Provisional application No. 61/984,102, filed on Apr. 25, 2014.

(51) Int. Cl.
| | |
|---|---|
| *H01M 4/04* | (2006.01) |
| *H01M 4/62* | (2006.01) |
| *H01M 4/583* | (2010.01) |
| *H01M 4/08* | (2006.01) |
| *H01M 4/58* | (2010.01) |
| *H01M 6/14* | (2006.01) |
| *H01M 4/38* | (2006.01) |
| *C01G 49/00* | (2006.01) |
| *H01M 4/40* | (2006.01) |
| *H01M 6/16* | (2006.01) |

(52) U.S. Cl.
CPC ............ *H01M 6/14* (2013.01); *C01G 49/009* (2013.01); *H01M 4/381* (2013.01); *H01M 4/5815* (2013.01); *C01P 2002/72* (2013.01); *C01P 2002/85* (2013.01); *C01P 2004/02* (2013.01); *C01P 2004/03* (2013.01); *C01P 2006/40* (2013.01); *H01M 4/405* (2013.01); *H01M 4/623* (2013.01); *H01M 4/625* (2013.01); *H01M 6/16* (2013.01)

(58) Field of Classification Search
CPC .... H01M 4/5815; H01M 4/381; H01M 4/405; H01M 4/623; H01M 4/625; H01M 6/14; H01M 6/16; C01P 2002/72; C01P 2002/85; C01P 2004/02; C01P 2004/03; C01P 2006/40; C01G 49/009
See application file for complete search history.

(56) References Cited

U.S. PATENT DOCUMENTS

| 3,992,222 A | 11/1976 | Walsh et al. |
| 4,390,604 A | 6/1983 | Evans et al. |
| 6,203,947 B1 * | 3/2001 | Peled ............... H01M 4/0445 429/221 |
| 8,153,296 B2 | 4/2012 | Jiang et al. |

FOREIGN PATENT DOCUMENTS

| EP | 2400585 | 12/2011 |
| WO | 2010117956 | 10/2010 |

OTHER PUBLICATIONS

X. Liu, H.-S.Kim, J.-H Hong, Z. Xu, H. Xiao, I.-S. Ahn, K.-W Kim. Electrochemical properties of mechanically alloyed Ni-doped FeS2 cathode materials for lithium-ion batteries, Powder Technol. 256, 2014, 545-552.*

X.J. Liu, Z.Z. Xu, H.J. Ahn, S.K. Lyu, I.S. Ahn. Electrochemical characteristics of cathode materials NiS2 and Fe-doped NiS2 synthesized by mechanical alloying for lithium-ion batteries, Powder Technol. 229, 2012, 24-29.*

X. Liu, D.-W. Park, Z. Xu, S.-D. Kang, I.-S. Ahn, H.OJ. Ahn. Synthesis of Cathode Materials Fe-doped NiS2 by Mechanical Alloying for Li/NiS2 Cells, Adv. Mater. Res., vol. 287-290, 2011, 1428-1432.*

Megan Becker, Relationship between Pyrrhotite, Pentlandite, and the Platinum Group Elements, Thesis submitted for the Degree of Doctor of Philosophy, Department of Materials Science & Metallurgical Engineering at University of Pretoria, pp. 1-70, 2009.

* cited by examiner

*Primary Examiner* — Carlos Barcena
(74) *Attorney, Agent, or Firm* — Michael F. Scallse; Steven W. Winn (57) ABSTRACT

The present invention relates to an electrochemical cell comprising an anode of a Group IA metal and a cathode of a composite material prepared from an aqueous mixture of iron sulfate, nickel sulfate, and sulfur. The cathode material of the present invention provides for a lithium electrochemical cell having an increased operating voltage and power performance with high discharge capacity as compared to a lithium cell comprising nickel disulfide cathode material. In addition, the cathode material of the present invention exhibits a smaller initial irreversible voltage loss as compared to iron disulfide. This makes the cathode material of the present invention particularly useful for implantable medical applications.

15 Claims, 7 Drawing Sheets

HIGH CAPACITY CATHODE MATERIAL WITH IMPROVED OPERATING VOLTAGE

CROSS-REFERENCE TO RELATED APPLICATION

This application claims priority from U.S. Provisional Application Ser. No. 61/984,102, filed Apr. 25, 2014.

TECHNICAL FIELD

This invention relates to the art of electrochemical cells, and more particularly, to a new and improved electrochemical cell, and a cathode therefore. The cell comprises a Group IA anode and a new composite metal cathode material. Still more particularly, the present invention is directed to the preparation of iron-nickel-disulfide having the stoichiometric formula of $Fe_xNi_{1-x}S_2$.

BACKGROUND OF THE INVENTION

Electrochemical cells provide electrical energy that powers a host of electronic devices such as external and implantable medical devices. Among these many medical devices powered by electrochemical cells are external medical drills and implantable cardiac defibrillators. Such medical devices generally require the delivery of a significant amount of electrical power over a relatively long period of time, for example up to ten years. Thus, these devices typically require the use of electrochemical cells that are capable of providing an increased discharge capacity at an increased operating voltage. As defined herein, "discharge capacity" (Ah) is the maximum amount of electrical current that can be drawn from a cell under a specific set of conditions. The term, "specific capacity" (Ah/g) is defined herein as the maximum amount of electrical current capable of being provided on a per gram basis of cathode active material when paired with an anode in an electrochemical cell. The term, "operating voltage" is defined herein as the voltage required for the proper operation of an electrical component, electrical circuit, device or system. Thus, providing an increased discharge capacity at an increased operating voltage enables the operation of higher voltage demanding devices over longer periods of time.

Cathode chemistries such as iron disulfide ($FeS_2$) have been developed to provide increased discharge capacities that meet the power demands of external and implantable medical devices. Iron disulfide cathode material is generally known to have a specific capacity with a lithium anode ranging from about 700 mAh/g to about 890 mAh/g, which is well suited for powering implantable medical devices over long periods of time. However, lithium electrochemical cells constructed with cathodes comprised of iron disulfide generally suffer an irreversible voltage loss on the order of about 2-3 V depending upon the electrolyte and amount of the applied load at the beginning of cell discharge. This results in the delivery of a reduced amount of operating voltage. Such a cathode chemistry is, therefore, not ideal for powering devices that require an increased operating voltage over long periods of time.

The applicants, therefore, have developed a new iron nickel disulfide cathode material formulation and cathode thereof that provides a lithium electrochemical cell having a discharge capacity that is greater than lithium cells comprising cathodes of iron disulfide. Furthermore, lithium electrochemical cells having cathodes comprised of the iron nickel disulfide cathode active material do not exhibit the initial irreversible voltage drop to the extent exhibited by comparable lithium cells comprising iron disulfide cathode active materials. Consequently, a cathode composed of the iron nickel disulfide material of the present invention when constructed within an electrochemical cell having a lithium anode is well suited for powering a variety of electrical devices that require a "high" discharge capacity and an increased operating voltage.

Thus, as will be discussed in more detail, the iron nickel disulfide cathode active material of the present invention comprises a unique chemical structure that provides a lithium electrochemical cell with electrical properties that are well suited to power a variety of electrical devices that require an increased discharge capacity with increased operating voltage capability.

SUMMARY OF THE INVENTION

The present invention relates to an electrochemical cell comprising an anode of a Group IA metal and a cathode of a composite material prepared from a combination of metal salts. Specifically, the present invention is of a primary electrochemical cell having a lithium anode and an iron nickel disulfide cathode active material that comprises iron sulfate and nickel sulfate. A catalyst comprising sodium sulfate such as sodium thiosulfate pentahydrate ($Na_2S_2O_3.5H_2O$) may be added to aid in the reaction that produces the iron nickel disulfide cathode material formulation of the present invention. The cathode active material is preferably fabricated in a hydrothermal process in which the metal salts, iron sulfate, nickel sulfate and in addition, sulfur are combined in an aqueous mixture with applied heat.

The cathode active material of the present invention incorporates the use of particular transition metal elements in a cathode chemical composition that provides for an increased operating voltage compared to iron disulfide when paired with a lithium anode. In addition, the iron nickel disulfide cathode active material enables a lithium cell to maintain a high level of discharge capacity traditionally provided by iron disulfide cathode materials.

A lithium electrochemical cell comprising the iron nickel disulfide cathode active material of the present invention has been shown to exhibit an electrical discharge capacity of about 32 mAh (FIG. 6), which is greater than a comparable lithium cell comprising a cathode of iron disulfide. Therefore, the iron nickel disulfide cathode material is a good candidate for use in lithium electrochemical cells that are used in applications that demand high device longevity. In addition, the cathode material of the present invention is more conducive to manufacturing as the material preparation is less complex. Furthermore, the gains in electrical performance are due to the inherent material properties of the novel cathode material itself where additives or costly processing and design changes are not required to realize the electrical performance benefits.

DETAILED DESCRIPTION OF THE PREFERRED EMBODIMENTS

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium.

The form of the anode may vary, but typically, the anode is a thin sheet or foil of the anode metal, pressed or rolled on a metallic anode current collector, i.e., preferably comprising nickel, to form an anode component. In the electrochemical cell of the present invention, the anode component has an extended tab or lead of the same metal as the anode current collector, i.e., preferably nickel, integrally formed therewith such as by welding and contacted by a weld to a cell case of conductive metal in a case-negative configuration. Alternatively, the anode may be formed in some other geometry, such as a bobbin shape, cylinder or pellet to allow an alternate low surface cell design.

The electrochemical cell of the present invention further comprises a cathode, and the electrochemical reaction at the cathode involves conversion of ions which migrate from the anode to the cathode into atomic or molecular forms. The cathode of the present invention, therefore, includes an electrically conductive composite cathode active material that comprises elements of iron, nickel, and sulfur resulting from the hydrothermal reaction of sulfur, a mixture of a first metal salt comprising iron and a second metal salt comprising nickel.

The cathode active material of this invention can be constructed by the chemical addition reaction, solid-state reaction or otherwise intimate contact of various combinations of metal sulfates or sulfides, preferably during thermal treatment, sol-gel formation, chemical vapor deposition or hydrothermal synthesis in mixed states. The materials thereby produced contain metals and oxides of the Groups IB, IIB, IIIB, IVB, VB, VIB, VIIB, and VIII which includes the noble metals and/or other oxide compounds. As defined herein, a solid state reaction is a chemical reaction in which two solid materials are fused together into one solid material through the application of heat over a prescribed period of time.

Cathode composites are prepared by thermally treating the first metal salt of iron sulfate with a mixture of the second metal salt of nickel sulfate and sulfur in an aqueous solution. In a preferred embodiment, the respective hydrates of the first and second metal salts are combined in the aqueous mixture. More preferably the first metal salt of iron (II) sulfate hydrate ($FeSO_4.7H_2O$) is combined with the second metal salt of nickel (II) sulfate hexahydrate ($NiSO_4.6H_2O$) and sulfur. These constituents are thoroughly mixed in distilled de-ionized water and thereafter heat treated. Thus, the composite cathode material may be described as a metal-metal, metal salt matrix and the range of material composition found for $Fe_xNi_{1-x}S_2$ (FNS) is preferably about $x \geq 0.10$ and more preferably about $0.15 \leq x \leq 0.25$.

In addition a catalyst comprising a sodium salt may be added to the aqueous admixture to aid in driving the hydrothermal reaction to form the iron nickel disulfide material of the present invention. In a preferred embodiment, the catalyst comprises a sodium sulfate salt. In a more preferred embodiment, the catalyst comprises a hydrate of the sodium sulfate salt such as sodium thiosulfate pentahydrate ($Na_2S_2O_3.5H_2O$).

In addition to the preferred iron sulfate ($FeSO_4$), other first metal salts may comprise iron acetate ($Fe(C_2H_3O_2)_2$), iron bromide ($FeBr_3$), iron perchlorate ($Fe(ClO_4)_2$), iron iodate ($FeI_2$), iron nitrate ($Fe(NO_3)_3$), iron oxalate ($Fe(C_2O_4)_3$), iron thiocyanate ($Fe(SCN)_3$), and respective hydrate forms thereof. Furthermore, in addition to the preferred nickel sulfate ($NiSO_4$), other second metal salts may comprise nickel chloride ($NiCl_2$), nickel formate ($Ni(CHO_2)_2$), nickel hypophosphite ($Ni(H_2PO_2)_2$), and respective hydrate forms thereof. A typical form of FNS prepared from the above described starting materials is $Fe_{0.15}Ni_{0.85}S_2$ or $Fe_{0.25}Ni_{0.75}S_2$.

Figure 1:
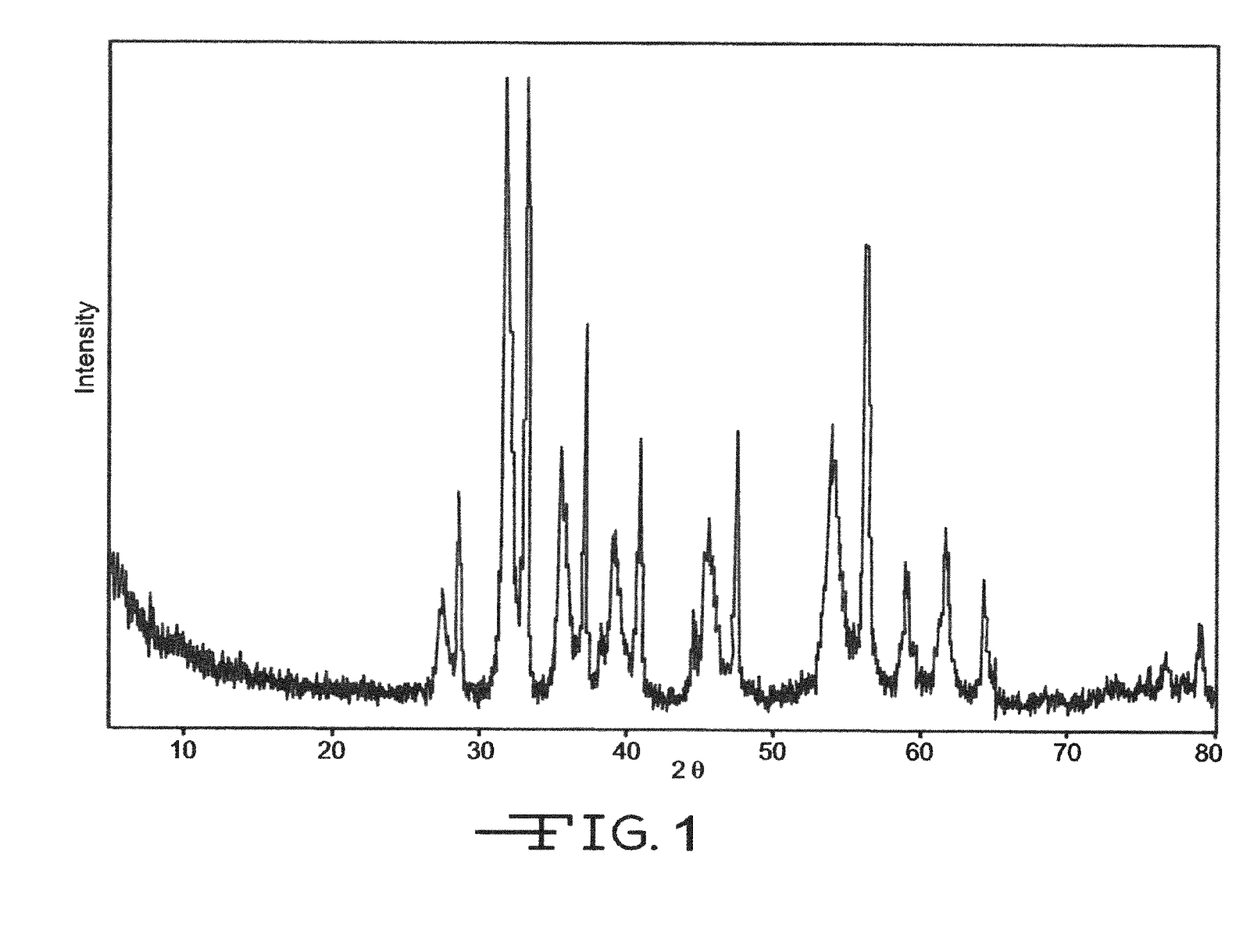
FIG. 1 illustrates an embodiment of an x-ray diffraction pattern of the $Fe_{0.15}Ni_{0.85}S_2$ cathode active material formulation of the present invention.

FIG. 1 illustrates an x-ray diffraction pattern of the cathode active material formulation having the stoichiometry of $Fe_{0.15}Ni_{0.85}S_2$. From the x-ray diffraction data, it was determined that the iron nickel disulfide cathode active material of the present invention comprises a cubic lattice structure having a unit cell dimension of between about 5.618 Å and 5.645 Å. The applicants have discovered that increasing the amount of nickel increases the size of the unit cell and thus, increases the unit cell dimension.

Such composite materials as those described above may be pressed into a cathode pellet with the aid of a suitable binder material such as a fluoro-resin powder, preferably polytetrafluoroethylene (PTFE) powder, and a material having electronic conductive characteristics such as graphite and/or carbon black. In some cases, no binder material or electronic conductor material is required to provide a similarly suitable cathode body. Further, some of the cathode matrix samples may also be prepared by rolling, spreading or pressing a mixture of the material mentioned above onto a suitable current collector. Cathodes prepared as described above may be in the form of one or more plates operatively associated with at least one or more plates of anode material, or in the form of a strip wound with a corresponding strip of anode material in a structure similar to a "jellyroll".

For example, the cathode active material is preferably mixed with a binder material such as a powdered fluoropolymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 98 weight percent of the cathode active material.

A preferred method of cathode preparation is by contacting a blank cut from a free-standing sheet of cathode active material to a current collector. Blank preparation starts by taking granular cathode material, in this case the iron nickel disulfide of the present invention, and adjusting its particle size and distribution to a useful range in an attrition or grinding step. These methods are further described in U.S. Pat. No. 6,566,007 to Takeuchi et al., which is assigned to the assignee of the present invention and incorporated herein by reference.

The exemplary cell of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

Other separator materials that are useful with the present invention include woven fabric separators comprising halogenated polymeric fibers, as described in U.S. Pat. No. 5,415,959 to Pyszczek et al., which is assigned to the assignee of the present invention and incorporated herein by reference. Examples of halogenated polymeric materials suitable for the electrochemical cell of the present invention include, but are not limited to, polyethylene tetrafluoroethylene which is commercially available under the name Tefzel, a trademark of the DuPont Company; polyethylenechlorotrifluoroethylene which is commercially available under the name Halar, a trademark of the Allied Chemical Company, and polyvinylidene fluoride.

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present invention is preferably activated with a nonaqueous, ionically conductive electrolyte operatively associated with the anode and the cathode. The electrolyte serves as a medium for migration of ions between the anode and the cathode during electrochemical reactions of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The preferred electrolyte of the present invention comprises an inorganic salt having the general formula $MAF_6$ wherein M is an alkali metal similar to the alkali metal comprising the anode and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$. $LiBF_4$, $LiAsF_6$, $LiSbF_6$, $LiClO_4$, $LiO_2$, $LiAlCl_4$, $LiGaCl_4$, $LiC(SO_2CF_3)_3$. $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof. More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. Thus, in the case of an anode comprising lithium, the alkali metal salt of the electrolyte preferably comprises either lithium hexafluoroarsenate or lithium hexafluorophosphate dissolved in a 50/50 solvent mixture (by volume) of PC/DME. For a more detailed description of a nonaqueous electrolyte for use in the exemplary cell of the present invention, reference is made to U.S. Pat. No. 5,580,683, which is assigned to the assignee of the present invention and incorporated herein by reference. In the present invention, the preferred electrolyte for a Li/FNS cell is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

One preferred form of the cell assembly described herein is referred to as a wound element cell. That is, the fabricated cathode, anode and separator are wound together in a "jellyroll" end type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte described hereinabove and hermetically sealed such as by close-welding a stainless steel ball over the fill hole, but not limited thereto. This above assembly describes a case-negative cell which is the preferred construction of the exemplary cell of the present invention. As is well known to those skilled in the art, the exemplary electrochemical system of the present invention can also be constructed in a case-positive configuration.

The electrochemical cell of the present invention operates in the following manner. When the ionically conductive electrolyte becomes operatively associated with the anode and the cathode of the cell, an electrical potential difference is developed between terminals operatively connected to the anode and the cathode. During discharge, the electrochemical reaction at the anode includes oxidation to form metal ions and the electrochemical reaction at the cathode involves conversion of these ions which migrate from the anode into atomic or molecular forms. Lithium electrochemical cells comprising FNS cathode material according to the present invention provide a high delivered capacity and are capable of delivering an increased operating voltage over a longer period of time.

The electrochemical cell according to the present invention is illustrated further by the following examples.

Example I

Material Test Sample

A test sample of iron nickel disulfide (FNS) was synthesized via a solid-state hydrothermal reaction of commercially available iron (II) sulfate heptahydrate ($FeSO_4.7H_2O$) mixed with nickel (II) sulfate hexahydrate ($NiSO_4.6H_2O$), sodium thiosulfate pentahydrate ($Na_2S_2O_3.5H_2O$) and sulfur (S). Specifically, iron (II) sulfate heptahydrate ($FeSO_4.7H_2O$) (0.25 g, $9\times10^{-4}$ mol) was added to a mixture of nickel (II) sulfate hexahydrate ($NiSO_4.6H_2O$) (0.24 g, $9\times10^{-4}$ mol), sodium thiosulfate pentahydrate ($Na_2S_2O_3.5H_2O$) (0.45 g, $1.8\times10^{-3}$ mol) and sulfur (S) (0.06 g, $1.8\times10^{-3}$ mol). These powders were thoroughly mixed by hand such as with a mortar and pestle. Alternatively, an attrition ball mill may be used to thoroughly mix the powder components together.

Once the powder components were mixed, about 15 ml of distilled de-ionized water was added to the mixture. The aqueous mixture was then subjected to a heat treatment whereby the mixture was heated to about 200° C. within ambient atmosphere conditions for about 24 hours, and mixed. In a preferred embodiment, the aqueous mixture is placed in a sealed vessel that contains the hydrothermal reaction therewithin. The hydrothermal reaction that occurs is a result of mixing these powder components with water with applied heat and evolved gas from the chemical reaction. Sealing the reacting aqueous mixture within a vessel contains the evolved heat and pressure therewithin and contributes to the formation of the preferred iron nickel disulfide material of the present invention. Upon cooling, the material was centrifuged, rinsed with distilled deionized water, and dried at 60° C. for about 5 hours.

Figure 2:
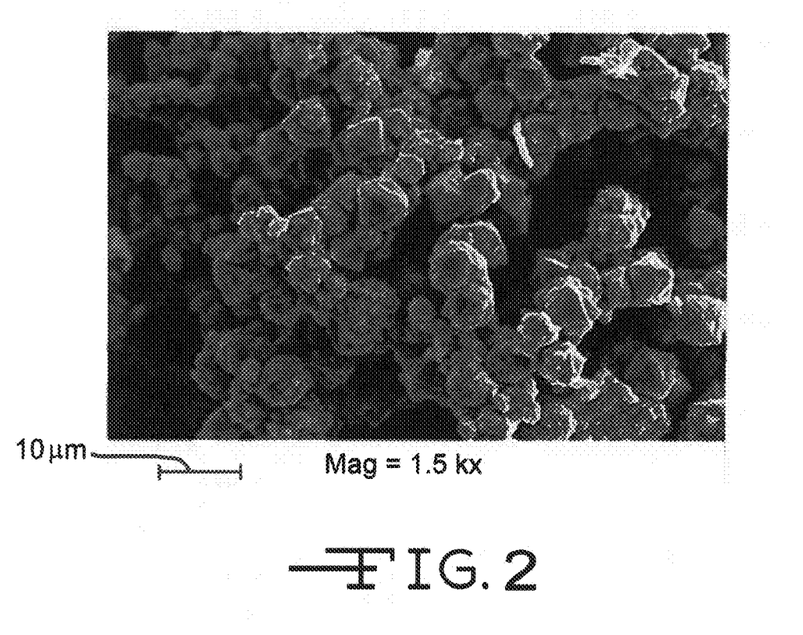
FIG. 2 is a micrograph showing the surface morphology and microstructure of the $Fe_{0.15}Ni_{0.85}S_2$ cathode active material formulation at 1.5 k times magnification.
Figure 3:
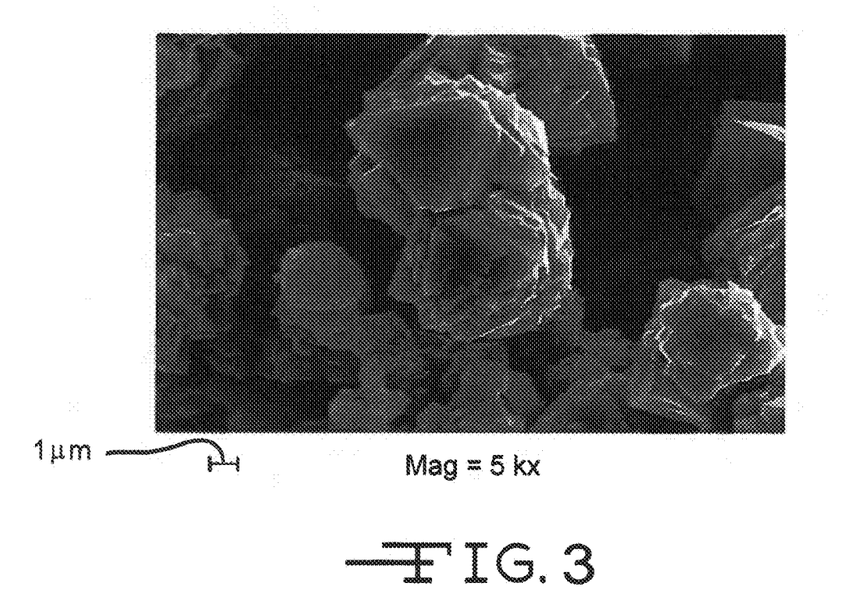
FIG. 3 is a micrograph showing the surface morphology and microstructure of the $Fe_{0.15}Ni_{0.85}S_2$ cathode active material formulation at 5 k times magnification.

FIGS. 2 and 3 are scanning electron microscopy images that show the surface morphology of the iron nickel disulfide cathode material of the present invention. As shown in the micrographs, the iron nickel disulfide cathode active material of the present invention comprises a homogenous microstructure having regions of a plate-like planar surface. FIG. 2 is a scanning electron microscopy image at 1.5 k magnification that shows the iron nickel disulfide cathode active material of the present invention to be of a uniform homogenous structure. FIG. 3 shows the surface morphology of the iron nickel disulfide cathode active material at 5 k magnification, further illustrating the uniform homogenous plate-like structure of specific material grains.

Figure 4:
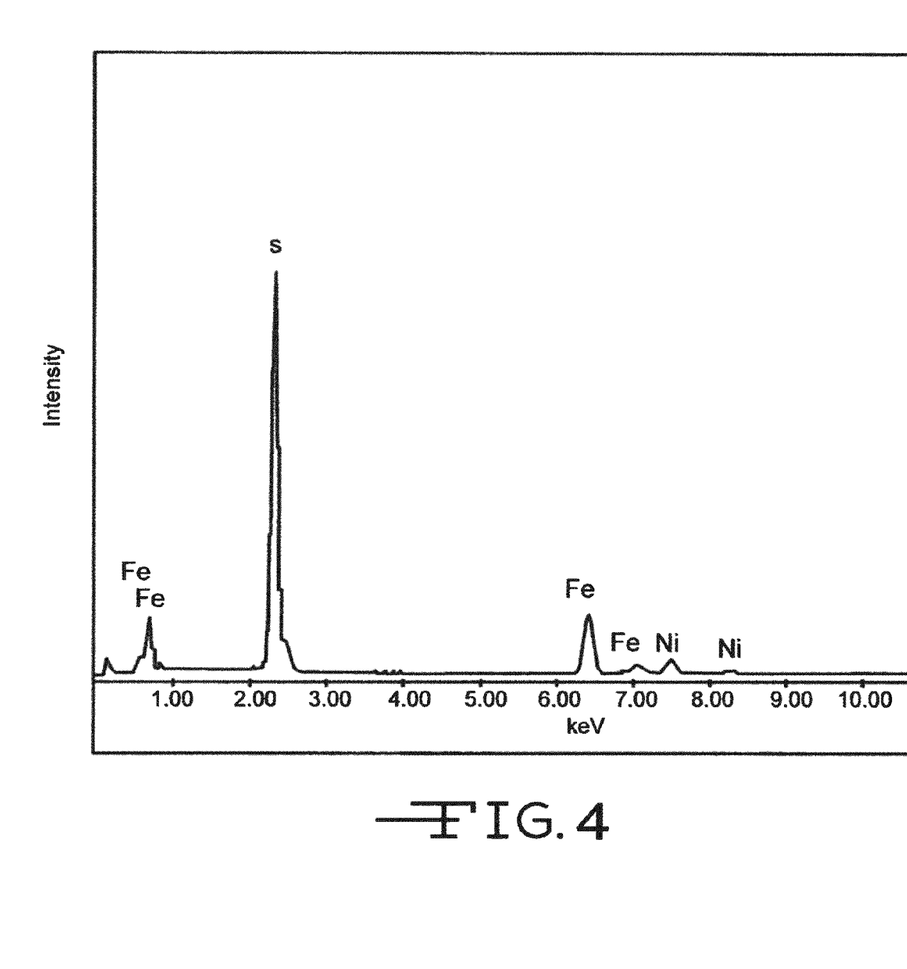
FIG. 4 is an energy dispersive spectrum taken of a grain of the $Fe_{0.15}Ni_{0.85}S_2$ cathode active material shown in FIG. 3.

FIG. 4 shows the results of energy dispersive spectroscopy (EDS) analysis that was performed on a portion of the surface of a particle of the material shown in FIG. 3. As the EDS analysis shows, the surface of the iron nickel disulfide material was identified to comprise the elements of sulfur, nickel, and iron which is in alignment with the x-ray diffraction pattern shown in FIG. 1.

Comparative Example I

Iron Disulfide Cathode Active Material Control Sample

A first comparative material sample of iron disulfide (FS), specifically $FeS_2$, was fabricated and used as a control to the iron nickel disulfide material described in the previous example. The control sample was synthesized via a solid-state hydrothermal reaction using commercially available iron (II) sulfate heptahydrate ($FeSO_4.7H_2O$) mixed with sodium thiosulfate pentahydrate ($Na_2S_2O_3.5H_2O$) and sulfur (S) in an aqueous solution. The material control sample was devoid of nickel sulfate to illustrate the attributes of the iron dopant used in the previous example. Specifically, iron (II) sulfate hexahydrate ($FeSO_4.7H_2O$) (0.5 g, $1.8\times10^{-3}$ mol) was added to sodium thiosulfate pentahydrate ($Na_2S_2O_3.5H_2O$) (0.45 g, $1.8\times10^{-3}$ mol) and sulfur (S) (0.06 g, $1.8\times10^{-3}$ mol). Using a mortar and pestle, this powder was ground to thoroughly mix the components. After mixing, about 15 ml of distilled de-ionized water was added to the powders to create an aqueous mixture thereof. The aqueous mixture was then positioned in the same sealed vessel and subjected to the same heat treatment as prescribed in Example I. The first cathode active control material had the stoichiometric formula of $FeS_2$.

Comparative Example II

Nickel Disulfide Cathode Active Material Control Sample

A second comparative cathode material sample of nickel disulfide (NS) was fabricated and used as a control to the iron nickel disulfide material described in Example I. The control sample was synthesized via a solid-state hydrothermal reaction using commercially available nickel (II) sulfate hexahydrate ($NiSO_4.6H_2O$) mixed with sodium thiosulfate pentahydrate ($Na_2S_2O_3.5H_2O$) and sulfur (S) in an aqueous solution. The material control sample was devoid of iron sulfate to illustrate the attributes of the nickel dopant used in the previous example. Specifically, nickel (II) sulfate hexahydrate ($NiSO_4.6H_2O$) (0.47 g, $1.8\times10^{-3}$ mol) was added to sodium thiosulfate pentahydrate ($Na_2S_2O_3.5H_2O$) (0.45 g, $1.8\times10^{-3}$ mol) and sulfur (S) (0.06 g, $1.8\times10^{-3}$ mol). This powder was ground to thoroughly mix the components, using a mortar and pestle. After mixing, about 15 ml of distilled de-ionized water was added to the powders to create an aqueous mixture thereof. The aqueous mixture was then positioned in the same sealed vessel and subjected to the same heat treatment as prescribed in Example I. The cathode active control material had the stoichiometric formula of $NiS_2$.

Figure 5:
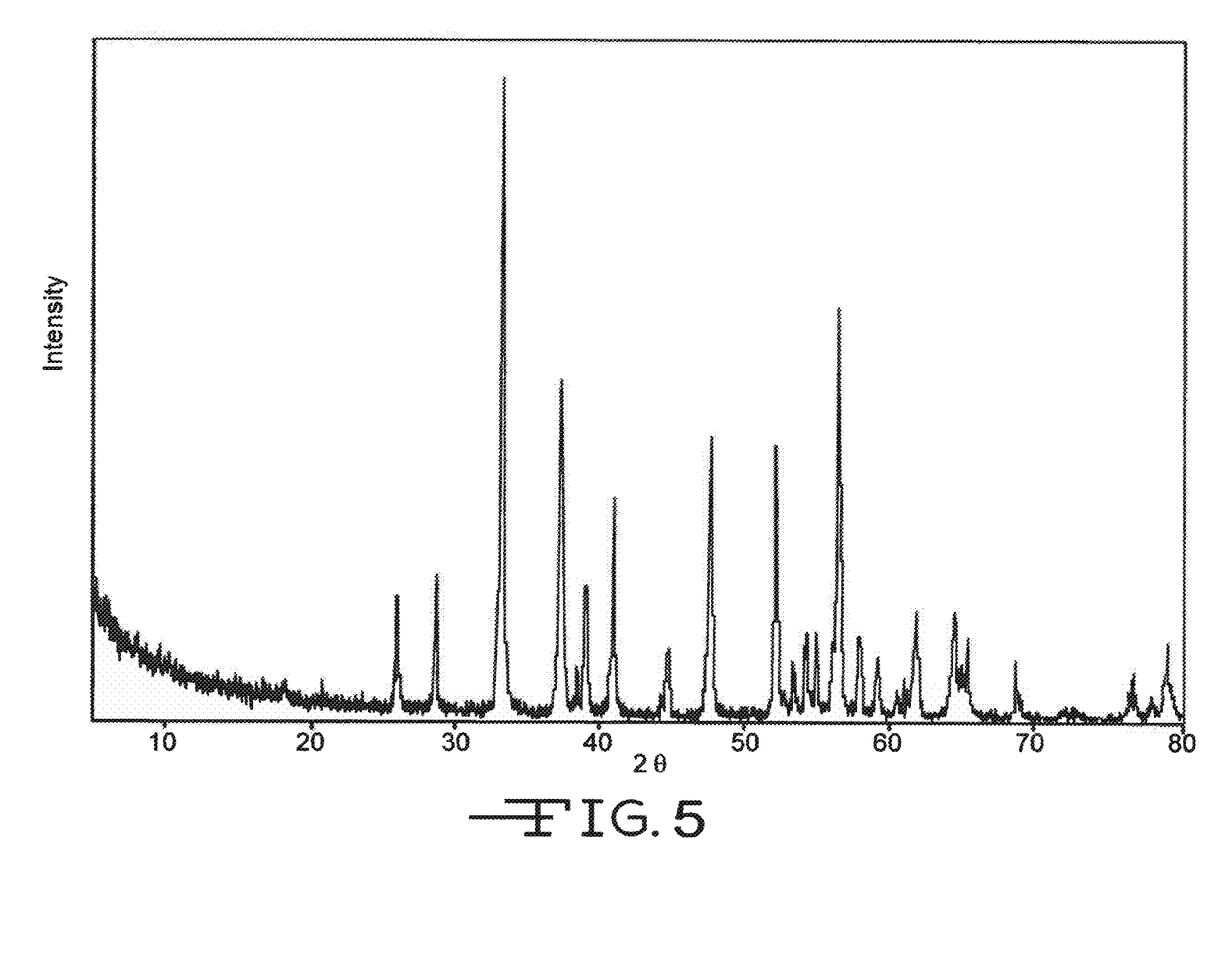
FIG. 5 illustrates an x-ray diffraction pattern of $FeS_2$ cathode material formulation.
Figure 6:
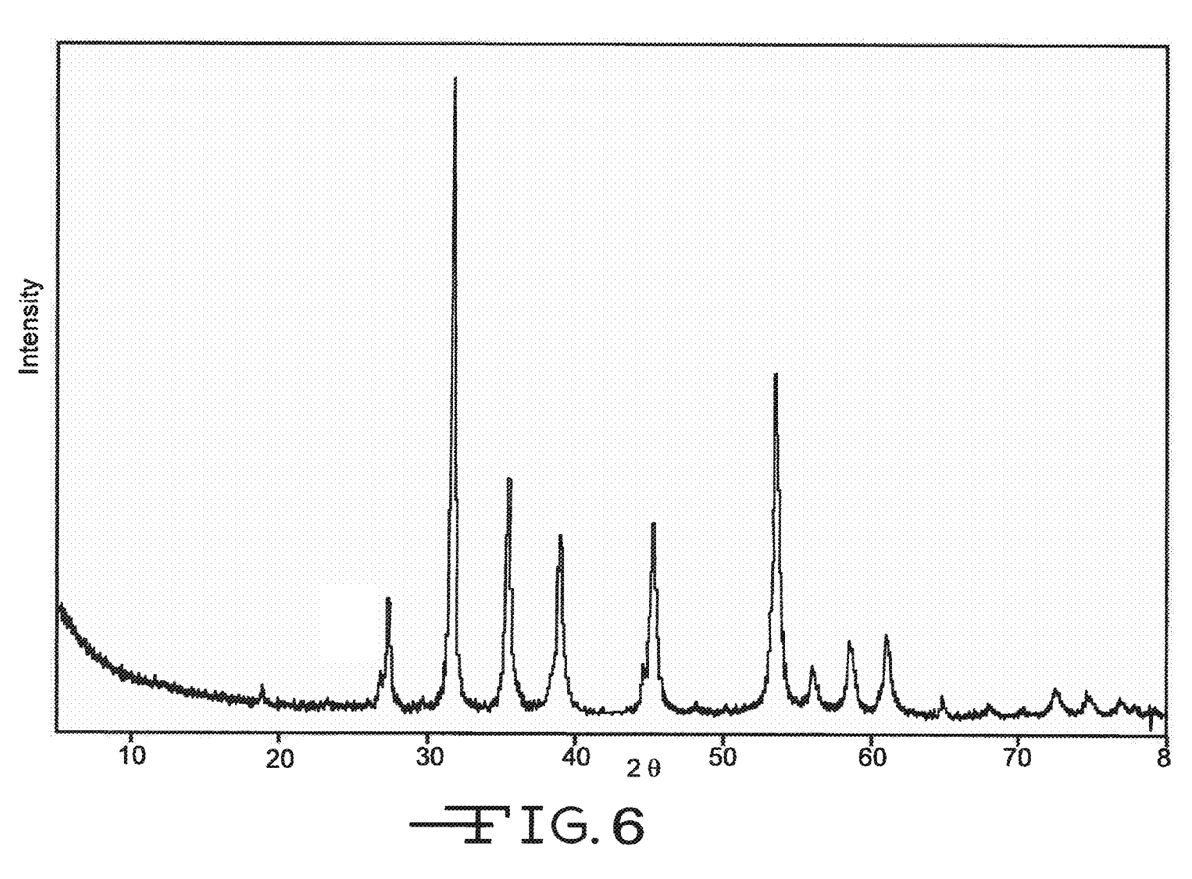
FIG. 6 is an x-ray diffraction pattern of $NiS_2$ cathode material formulation.

FIGS. 5 and 6 are x-ray diffraction patterns of the respective iron disulfide and nickel disulfide cathode active control materials. As shown, these diffraction patterns are distinctly different than the x-ray diffraction pattern of the iron nickel disulfide cathode active material of the present invention, as shown in FIG. 1. As compared to the x-ray diffraction patterns of the iron disulfide and nickel disulfide cathode active control materials (FIGS. 5 and 6), the x-ray diffraction pattern of the iron nickel disulfide material (FIG. 1) exhibits a different pattern of peaks. This distinction between the x-ray diffraction patterns of the iron nickel disulfide and those of the iron disulfide and nickel disulfide control materials illustrate that the iron nickel disulfide material of the present invention comprises a homogenous material having a unique chemical structure that is different from the initial starting materials, i.e., the control cathode materials. For example, the x-ray diffraction peaks that appear at 27°, 32°, 35°, and 45° 2θ, respectively in the diffraction pattern of the nickel disulfide control material shown in FIG. 6, are shifted between 0.15 to 0.40 degrees of increasing degrees 2θ to the right along the x-axis of the diffraction pattern in the x-ray diffraction pattern of the $Fe_{0.15}Ni_{0.85}S_2$ cathode active material of the present invention (FIG. 1). The shift of these nickel disulfide peaks that appear in the x-ray diffraction pattern of the cathode active material of the present invention indicate the formation of a new homogenous cathode material that is distinctly different than the starting materials.

Example II

Electrochemical Test Cells

Identical lithium anode electrochemical cells, with the exception of the cathode material, were constructed to test and compare the electrical performance properties of the FNS cathode active material made according to Example I. One test electrochemical cell was constructed having a lithium anode and a cathode comprised of the FNS cathode material made according to Example I with the cathode materials of Comparative Examples I and II. A first control lithium anode electrochemical cell having a cathode comprised of the FS control material was made according to Comparative Example I. A second control lithium anode electrochemical cell having a cathode comprised of the NS control material was made according to Comparative Example II. In addition, both the first and second control cells and the test cell were constructed comprising an electrolyte solvent mixture of propylene (PC) and dimethoxyethane (DME) in which 1.2M $LiAsF_6$ was dissolved.

Each of the respective test and control cells were discharged at room temperature under a constant electrical load for 7 days to electrical energy depletion. The applied electrical load was normalized based on the total cathode mass of the respective cells to give 7 days of capacity. A constant electrical load of 10 kohm was applied to the Li/FNS test cell and a constant electrical load of 13.7 kohm and 12 kohm was applied to the Li/FS and Li/NS control cells, respectively.

Figure 7:
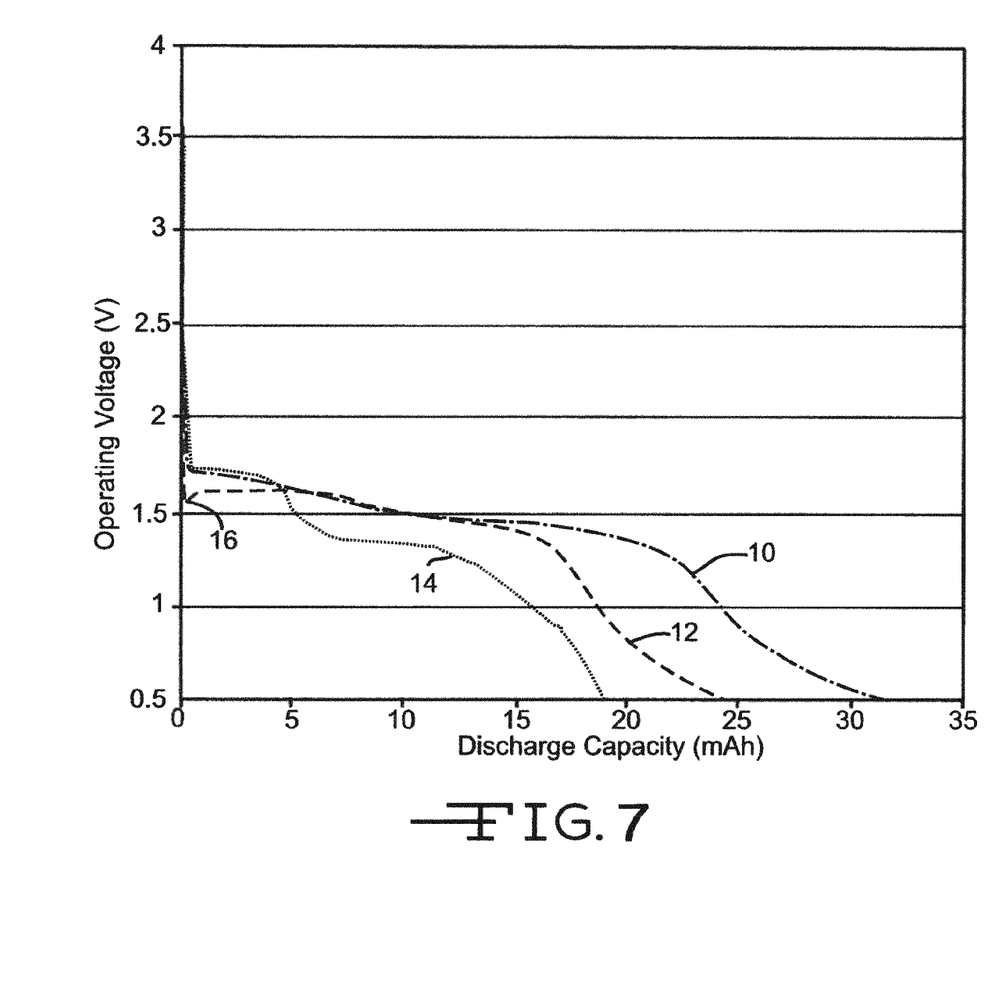
FIG. 7 shows comparative capacity vs. operating voltage profiles for lithium electrochemical cells constructed with cathodes comprising respective material formulations of $Fe_{0.15}Ni_{0.85}S_2$, $FeS_2$, and $NiS_2$.

FIG. 7 illustrates the discharge capacity in mAh with respect to operating voltage that were exhibited by the respective Li/FNS test cell and Li/FS and Li/NS control cells over the 7 day period. Specifically, FIG. 7 shows the discharge capacity vs. operating voltage profiles of the test and control lithium cells constructed with cathodes comprising cathode active material formulations, $Fe_{0.15}Ni_{0.85}S_2$ of the present invention (curve 10) and control cathode formulations $FeS_2$ (curve 12) and $NiS_2$ (curve 14).

As illustrated, the test cell constructed with a cathode comprising the cathode active material formulation $Fe_{0.15}Ni_{0.85}S_2$ of the present invention (curve 10) exhibited the greatest discharge capacity of about 31 mAh over the 7 day period. The discharge capacity exhibited over the 7 day period was about 6 mAh greater than the test cell comprising iron disulfide (curve 12) and about 12 mAh greater than the test cell comprising nickel disulfide (curve 14). In addition, the test cell comprising the iron nickel disulfide formulation of the present invention exhibited a smaller irreversible drop in operating voltage as compared to the test cell comprising the iron disulfide comparative cathode active material indicated at point 16 for the $FeS_2$ curve 12.

Furthermore, the operating voltage generated by the lithium cell comprising the iron nickel disulfide cathode active material of the present invention was greater than the operating voltages generated by the cells comprising respective iron disulfide and nickel disulfide cathode active materials. For example, at a capacity of about 25 mAh, the operating voltage for both lithium cells comprising the respective $FeS_2$ and $NiS_2$ cathode active formulations had dropped to about 0.5 volts or below, whereas the lithium cell comprising the cathode of the iron nickel disulfide formulation exhibited an operating voltage of about 1V.

Figure 8:
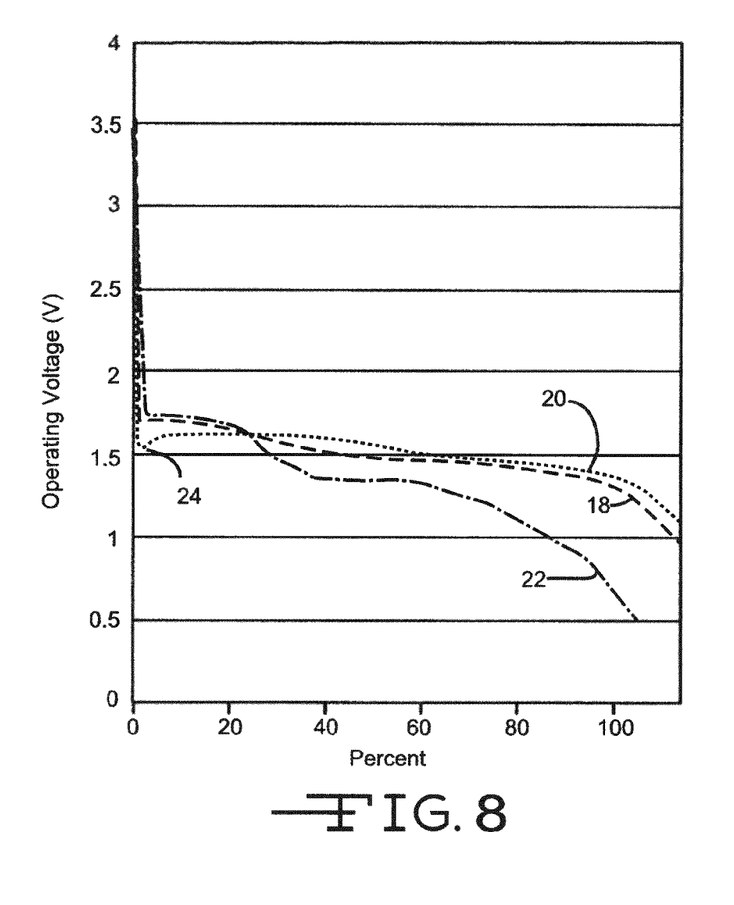
FIG. 8 illustrates depth of discharge testing results for electrochemical cells constructed with a lithium anode and a cathode comprised of the iron nickel disulfide cathode active material of the present invention in comparison to cathode active control materials, iron disulfide and nickel disulfide.

FIG. 8 illustrates the depth of discharge results as a function of operating voltage for the test lithium cells comprising cathodes composed of the respective cathode active material formulations, $Fe_{0.15}Ni_{0.85}S_2$ (curve 18), $FeS_2$ (curve 20) and $NiS_2$ (curve 22). As shown, the cell comprising the iron nickel disulfide cathode formulation of the present invention exhibited a greater discharge capacity similar to the lithium cell comprising the $FeS_2$ cathode material. In addition, the lithium cell comprising the iron nickel disulfide cathode formulation exhibited a higher operating voltage similar to that of the lithium cell comprising the nickel disulfide cathode formulation. In the same manner, unlike the lithium cell constructed with the iron disulfide cathode, the test cell constructed with the iron nickel disulfide cathode active material did not exhibit the same magnitude of irreversible operating voltage loss identified at point 24 in the graph for the $FeS_2$ (curve 20).

It is noted that the cutoff voltage for lithium cells comprising the iron nickel disulfide cathode formulation is about 1.3V. The discharge testing that was performed was designed such that the 1.3V cutoff voltage would occur at about 100 percent depth of discharge. The excess discharge that is shown past 100% discharge is generally attributed to the cell being constructed having an excess amount of cathode active material such that energy depletion occurred slightly after the 7 day period.

Thus, electrochemical cells constructed with a cathode comprising the iron nickel disulfide material formulation of the present invention were shown to exhibit increased capacity and an improved operating voltage and power performance. The above detailed description and examples are intended for purposes of illustrating the invention and are not to be construed as limited.

What is claimed is:

1. An electrochemical cell, comprising:
   a) an anode of a Group IA metal;
   b) a cathode comprising iron nickel disulfide having the general formula $Fe_xNi_{1-x}S_2$, wherein $0.15 \leq x \leq 0.25$;
   c) a separator positioned between the anode and the cathode; and
   d) an ionically conductive electrolyte activating the anode and the cathode.

2. The electrochemical cell of claim 1 wherein the cathode comprises a binder material.

3. The electrochemical cell of claim 2 wherein the binder material is a fluoro-resin powder.

4. The electrochemical cell of claim 1 wherein the cathode comprises a conductive additive material.

5. The electrochemical cell of claim 4 wherein the conductive additive material is selected from the group consisting of carbon, graphite, and a combination thereof.

6. An electrochemical cell, comprising:
   a) an anode comprising lithium;
   b) a cathode comprising a cathode active material of either $Fe_{0.15}Ni_{0.85}S_2$ or $Fe_{0.25}Ni_{0.75}S_2$;
   c) a separator positioned between the anode and the cathode; and
   d) an ionically conductive electrolyte activating the anode and the cathode.

7. The electrochemical cell of claim 6 wherein the cathode comprises a binder material.

8. The electrochemical cell of claim 7 wherein the binder material is a fluoro-resin powder.

9. The electrochemical cell of claim 6 wherein the cathode comprises a conductive additive material.

10. The electrochemical cell of claim 9 wherein the conductive additive material is selected from the group consisting of carbon, graphite, and a combination thereof.

11. The electrochemical cell of claim 6 wherein the electrolyte comprises a Group IA metal salt dissolved in a nonaqueous solvent.

12. The electrochemical cell of claim 11 wherein the nonaqueous solvent comprises an inorganic or organic solvent.

13. A method for making a cathode active material for an electrochemical cell, the method comprising the steps of:
   a) selecting a first metal salt from the group consisting of iron sulfate ($FeSO_4$), iron acetate ($Fe(C_2H_3O_2)_2$), iron bromide ($FeBr_3$), iron perchlorate ($Fe(ClO_4)_2$), iron iodate ($FeI_2$), iron nitrate ($Fe(NO_3)_3$), iron oxalate ($Fe(C_2O_4)_3$), iron thiocyanate ($Fe(SCN)_3$), and respective hydrate forms thereof;
   b) selecting a second metal salt from the group consisting of nickel sulfate ($NiSO_4$), nickel chloride ($NiCl_2$), nickel formate ($Ni(CHO_2)_2$), nickel hypophosphite ($Ni(H_2PO_2)_2$), and respective hydrate forms thereof;
   c) mixing the first metal salt and the second metal salt with sulfur to thereby provide a metal salt matrix admixture; and
   d) reacting the metal salt matrix admixture to provide the cathode active material having the general formula $Fe_xNi_{1-x}S_2$, wherein $0.15 \leq x \leq 0.25$.

14. The method of claim 13 including heating the metal salt matrix admixture to a temperature of from about 100° C. to 300° C.

15. The method of claim 13 including adding de-ionized water to the first metal salt and the second metal salt mixed with sulfur prior to reacting the resulting metal salt matrix admixture to provide the cathode active material.

\* \* \* \* \*